United States Patent
Zhou et al.

[11] Patent Number: 5,815,812
[45] Date of Patent: Sep. 29, 1998

[54] SOFT HANDOFF SYSTEM OF SPREAD SPECTRUM COMMUNICATION

[75] Inventors: Changming Zhou; Guoliang Shou; Makoto Yamamoto, all of Tokyo; Mamoru Sawahashi; Fumiyuki Adachi, both of Yokohama; Sunao Takatori, Tokyo, all of Japan

[73] Assignees: NTT Mobile Communications Network, Inc.; Yozan, Inc., both of Tokyo, Japan

[21] Appl. No.: 760,257

[22] Filed: Dec. 5, 1996

[30] Foreign Application Priority Data

Dec. 6, 1995 [JP] Japan ............................. 7-344878

[51] Int. Cl.⁶ ............................................. H04Q 7/32
[52] U.S. Cl. ...................... 455/442; 455/525; 370/332; 375/206
[58] Field of Search ............................ 455/442, 561, 455/560, 524, 525; 370/331, 332; 375/343, 206

[56] References Cited

U.S. PATENT DOCUMENTS 5,101,501  3/1992  Gilhousen et al. .
5,179,571  1/1993  Schilling ................................. 370/331
5,261,119  11/1993 Cahill ...................................... 455/561
5,416,797  5/1995  Gilhousen et al. ..................... 455/442
5,640,414  6/1997  Blakeney, II et al. ................. 370/332

OTHER PUBLICATIONS

"Mobile Station–Base Sation Compatibility Standard for Dual–Mode Wideband Spread Spectrum Cellular System", TIA/EIA Interim Standard, Jul. 1993, p. 6–154–158.

"An Overview of the Application of Code Division Multiple Access (CDMA) to Digital . . . ", May 21, 1992.

*Primary Examiner*—Edward F. Urban
*Assistant Examiner*—Hoa Huy Do
*Attorney, Agent, or Firm*—Cushman Darby & Cushman IP Group of Pillsbury Madison & Sutro LLP

[57] ABSTRACT

The present invention provides a system for soft handoff, which processes in high speed. A system according to the present invention substantially realizes a multiplication by a circuit for classifying received signals from a plurality of cell site stations once held in an analog sampling and holding circuit into two groups, multiplication and accumulation, by a small circuit of low electric power consumption.

8 Claims, 4 Drawing Sheets

SOFT HANDOFF SYSTEM OF SPREAD SPECTRUM COMMUNICATION

FIELD OF THE INVENTION

The present invention relates to a system for soft handoff of spread spectrum communication.

BACKGROUND OF THE INVENTION

With respect to cellular mobile radio communication, a mobile system usually communicates with another user by way of one cell-site station. In response to the movement of the mobile system, the relay station is changed. Here in the mobile system, the cell-site station with the strongest signal is selected by comparing the strength of received signals from a plurality of cell-site stations. A system for selecting the cell-site station with the strongest signal is disclosed in U.S. Pat. No. 5,101,501 (especially in the first paragraph in the tenth column). By the system, the selection is performed by measuring the strength of pilot signals from a plurality of cell-site stations by a searcher receiver.

Conventionally, in order to realize such a structure, DSP (digital signal processor) and other digital circuits are used. It has been difficult to build in a large circuit considering the necessary compactness of a mobile system, electric power consumption and the price. Therefore, lower speed circuits such as a sliding correlator and the like are used for realizing a synchronizing and acquisition of signals, with small size.

SUMMARY OF THE INVENTION

The present invention solves the above problems and provides a system for soft handoff, which processes in high speed.

A system according to the present invention substantially realizes a multiplication by a circuit for classifying received signals once held in an analog sampling and holding circuit into two groups multiplication and accumulation by a small circuit of low electric power consumption.

EMBODIMENT

Hereinafter an embodiment of the present invention is described with reference to the attached drawings.

Figure 1:
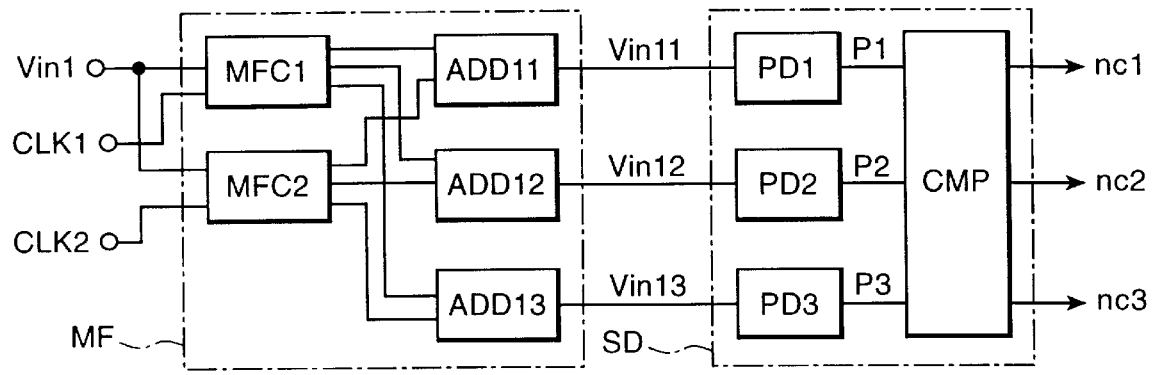
FIG. 1 shows the embodiment of the system of the present invention.

In FIG. 1, a system for soft handoff includes a signal detecting circuit SD which consists of a plurality of electric power detecting circuits PD1, PD2 and PD3, to which input signals Vin11, Vin12 and Vin13 are input, respectively. Outputs P1, P2 and P3 of the circuits PD1 to PD3 are input to a comparator circuit CMP which outputs signals nc1, nc2 and nc3 indicating the cell-site station to be connected with mobile system.

The input signals Vin11 to Vin13 are generated by a matched filter MF including matched filter circuits MFC1 and MFC2. An input signal of an intermediate frequency IF or a base band are commonly input to the matched filter circuits MFC1 and MFC2, each of which outputs a plurality of groups of signals (three in FIG. 1). Sampling clocks CLK1 and CLK2 shifted to each other by half cycle of the chip time are input to the MFC1 and MFC2, respectively, and double sampling is performed. The three groups of signals of MFC1 and MFC2 are calculated by three PN code sequences, and the electric power of the signals from the three cell-site station can be compared. The each outputs of MFC1 and MFC2 corresponding to the three groups of signals are input to addition circuits ADD11, ADD12 and ADD13, then, the results of the double sampling output from the cell-site stations are added. It is possible to perform higher degree of over sampling by parallelly setting more matched filters with a plurality of clocks successively shifted.

Figure 2:
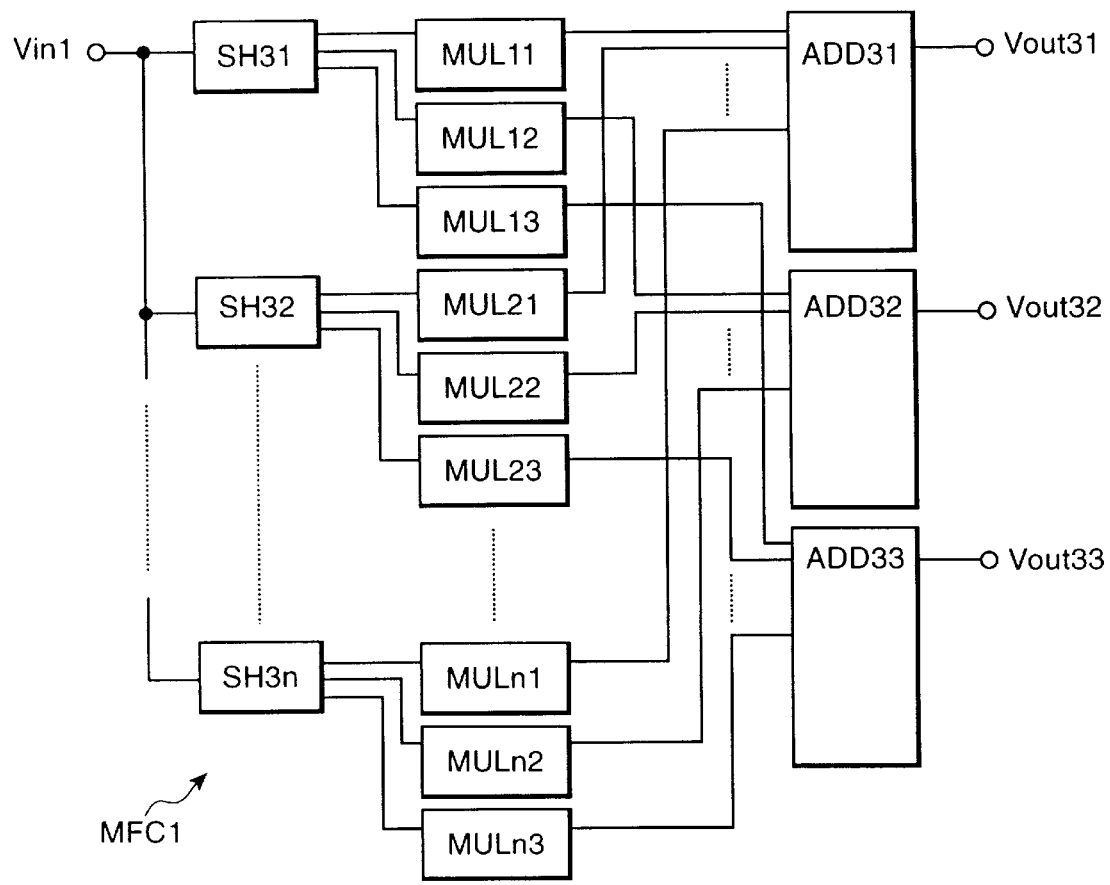
FIG. 2 shows the block diagram of a matched filter circuit in the embodiment.

In FIG. 2, the matched filter circuit MFC1 includes a plurality of (n number of) sampling and holding circuits SH31 to SH3n to which an input signal Vin1 is parallelly input. Each sampling and holding circuit outputs a holding data to a plurality of (three) groups. For example, an output of SH31 is input to three multiplying circuits MUL11, MUL12 and MUL13. Similar to it, an output of SH32 is input to multiplication circuits MUL21, MUL22 and MUL23, an output of SH33 is input to multiplication circuits MUL31, MUL32 and MUL33, . . . an output of SH3n is input to multiplication circuits MULn1, MULn2 and MULn3.

There are provided three multiplication circuits, corresponding to the three groups. As an output of MULi1 (i=1 to n) is input to the common addition circuit ADD31, an output of MULi2 (i=1 to n) is input to the common addition circuit ADD32, and an output of MULi3 (i=1 to n) is input to the common addition circuit ADD33. Each of the addition circuits ADD31, ADD32 and ADD33 adds inputs thereto and outputs an addition results Vout31, Vout32 and Vout33, respectively.

As the matched filter circuit MFC1 holds a signal for correlation calculation by sampling and holding circuits SH31 to SH3n of one group, the size of the whole circuit becomes small, therefore, electric power consumption can be reduced, comparing with the case that a plurality of sampling and holding circuits are provided for each group.

Figure 3:
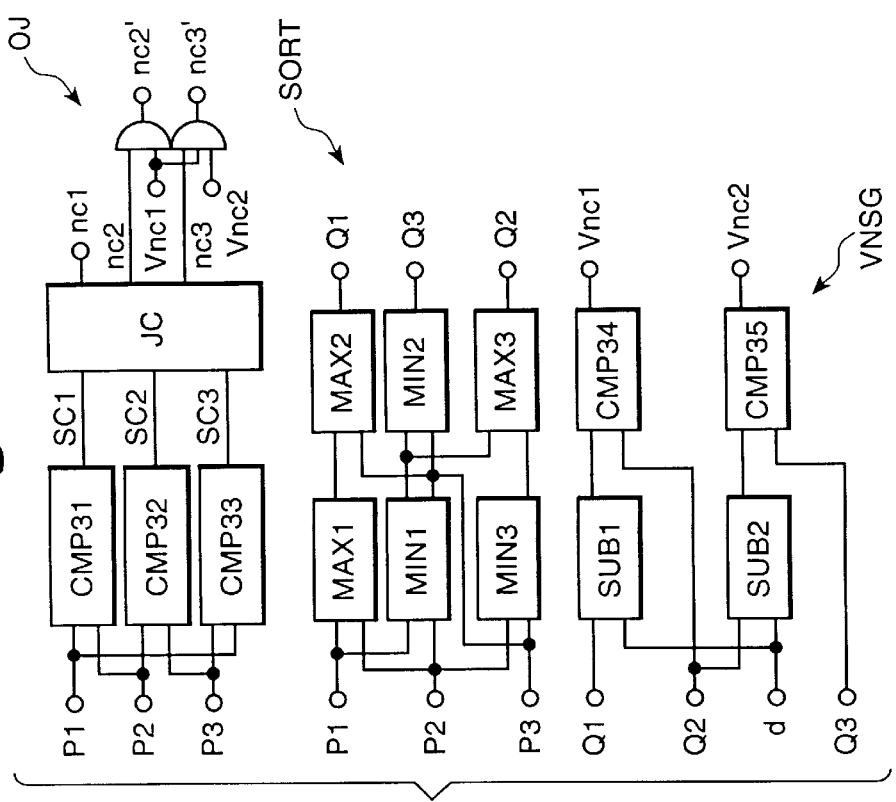
FIG. 3 shows the comparison circuit in FIG. 1.

The comparison circuit CMP includes an order judging circuit OJ, a sorting circuit SORT and an valid number signal generating circuit VNSG as shown in FIG. 3. The signals nc1 to nc3 are outputted from the judging circuit JC. The circuit OJ includes comparison circuits CMP31, CMP32 and CMP33 to which the P1 and P2, P2 and P3, and P3 and P1 are input, respectively. The comparison circuits CMP31, CMP32 and CMP33 output signals showing the comparison result of input signals, SC1, SC2 and SC3. SC1 is a 1 bit signal, which is 1 when P1≦P2 and is 0 when P1>P2. SC2 is a 1 bit signal, which is 1 when P2≦P3 and is 0 when P2>P3. SC3 is a 1 bit signal, which is 1 when P3≦P1 and is 0 when P3>P1. The values of the signals and the relationship among P1, P2 and P3 are shown in the Table 1.

TABLE 1

Relationship Among P1, P2 and P3

| SC1 | SC2 | SC3 | Relationship |
|-----|-----|-----|--------------|
| 1 | 0 | 0 | P1 < P3 < P2 |
| 0 | 1 | 0 | P2 < P1 < P3 |
| 1 | 1 | 0 | P1 < P2 < P3 |
| 0 | 0 | 1 | P3 < P2 < P1 |
| 1 | 0 | 1 | P3 < P1 < P2 |
| 0 | 1 | 1 | P2 < P3 < P1 |

Each of the value of nc1 to nc3 is one of 1, 2 and 3 which shows the P1 to P3. For example, when $P1 \leq P3 \leq P2$, nc1=2, nc2=3 and nc3=1. Therefore, nc1 to nc3 are expressed by the binary number of 2 bits. Assuming the lower digit and upper digit of the each bit to be b0(nci) and b1(nci)(i=1, 2, 3), formulas (1) to 6) are defined as below.

$$b0(nc3) = SC1 \cdot \overline{SC3} + \overline{SC2} \cdot SC3 \quad (1)$$

$$b1(nc3) = S\overline{C1} \cdot SC2 + \overline{SC2} \cdot SC3 \quad (2)$$

$$b0(nc2) = \overline{SC1 \oplus SC3} + \overline{SC2 \oplus SC3} \quad (3)$$

$$b1(nc2) = \overline{SC1} \oplus SC\overline{2} + \overline{SC2 \oplus SC3} \quad (4)$$

$$b0(nc1) = \overline{SC1} \cdot SC3 + SC2 \cdot \overline{SC3} \quad (5)$$

$$b1(nc1) = SC1 \cdot \overline{SC2} + SC2 \cdot \overline{SC3} \quad (6)$$

Figure 4:
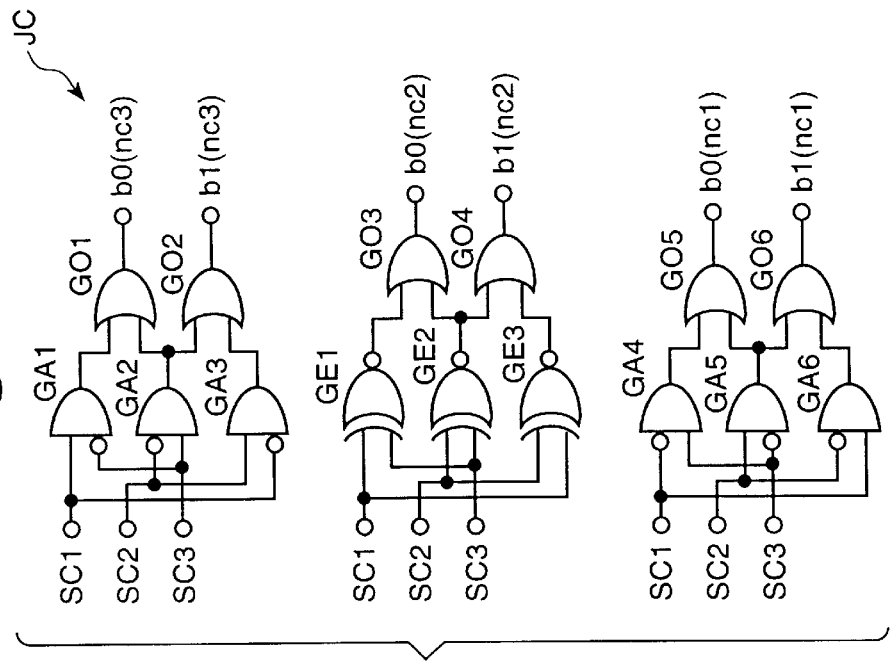
FIG. 4 shows the block diagram of a judging circuit in FIG. 3.

FIG. 4 shows a logic circuit for performing the logic calculations above. The circuit includes AND gates GA1 to GA6, OR gates GO1 to GO6, and EX_NOR gates GE1 to GE3. The inverted signal of the SC3 and non-inverted signal of the SC1 are input to the AND gate GA1, the inverted signal of the SC3 and non-inverted signal of the SC3 are input to the GA2, the inverted signal of the SC1 and non-inverted signal of the SC2 are input to the GA3, the inverted signal of the SC1 and non-inverted signal of the SC3 are input to the GA4, the inverted signal of the SC3 and non-inverted signal of the SC2 and input to the GA5, and the inverted signal of the SC2 and non-inverted signal of the SC1 are input to the GA6. The SC1 and SC3, SC2 and SC3, and SC1 and SC2 are input to the EX_NOR gates GE1, GE2 and GE3, respectively. Outputs of GA1 and GA2 are input to OR gate GO1, outputs of GA2 and GA3 are input to GO2, outputs of GE1 and GE2 are input to GO3, outputs of GE2 and GE3 are input to GO4, outputs of GA4 and GA5 are input to GO5, and outputs of GA5 and GA6 are input to GO6. b0 (nc3), h1 (nc3), b0 (nc2), b1 (nc2), b0 (nc1), and b1 (nc1) are output from GO1 to GO6, respectively.

The sorting circuit SORT outputs the maximum one in P1 to P3 as Q1, the second one in them as Q2, and the minimum one in them as Q3. The SORT comprises the maximum value circuits MAX1 to which P1 and P2 are input, and MAX2 to which an output of the MAX1 and P3 are input. Q1 is output as an output of MAX2. P1 and P2 are input to the minimum circuit MIN1. An output of the MIN1 and P3 are input to the second minimum circuit MIN2, in which the minimum value Q3 is calculated. P2 and P3 are input to the third minimum value circuit MIN3. Outputs of the MIN3 and the MIN1 are input to the third maximum value circuit MAX3, and Q2 is calculated in it.

The valid number signal generating circuit VNSG comprises subtraction circuits SUB1 and SUB2 for subtracting the predetermined value d from Q1 and Q2. An output of SUB1 and Q2 are input to a comparison circuit CMP34. The CMP34 outputs 1 when (Q1−d)<Q2, and outputs a valid number signal Vnc1 to be 0 when (Q1−d)≧Q2. An output of SUB2 is input to a comparison circuit CMP35 with Q3. The CMP35 outputs 1 when (Q2−d)<Q3, and outputs the valid number signal Vnc2 to be 0 when (Q2−d)≧Q3. Signals nc2 and nc3 of OJ are occasionally made invalid by Vnc1 and Vnc2.

When one signal is sufficiently stronger than the others among signals from a plurality of cell-site stations (the value is defined by d above), the communication is relayed only by the cell-site station. When the strongest signal and the second are close to each other, good communication is possible by a synthesized signals of both cell-site stations. In addition when the strength of the second and the third signals are also close, the third signal should also be used. Even if the difference between the second and the third signals is little, only the first signal should be used when the difference between the first and the second signals is large. According to the above, the logical multiplication nc2' of nc2 and Vnc1, and the logical multiplication nc3' of nc3, Vnc1, and Vnc2 are generated. The results of the logical multiplication are nc2 and nc3 when nc2 and nc3 are valid, and the are 0 when nc2 and nc3 are invalid. That is, one or a plurality of cell-site stations are designated by nc1 to nc3.

Figure 5:
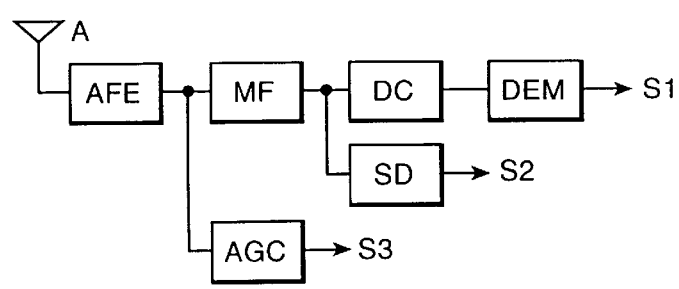
FIG. 5 shows the block diagram of whole of a receiver.

The appropriate cell-site station is selected by the above system. The whole structure of the receiving system is shown in FIG. 5. A signal of radio frequency from antenna A is converted into a signal of middle frequency or a base band signal by an analog front end AFE, and the signal of intermediate frequency or a base band signal is input to the matched filter MF. An output of the matched filter is inputted to a diversity composing circuit CD and signals of a plurality of cell-site station is performed diversity composition. An output of DC is input to a demodulation circuit DEM and demodulated. An output of the matched filter is input to the signal detecting circuit SD.

Figure 6:
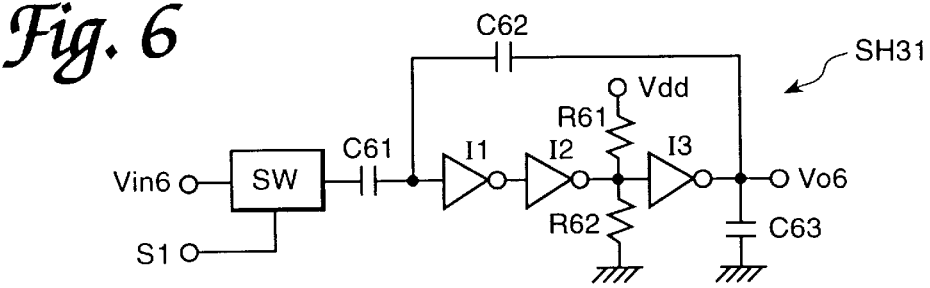
FIG. 6 shows the sampling and holding circuit in FIG. 2.

The sampling and holding circuit SH31 is structured as in FIG. 6, in which an input voltage Vin6 is connected to a switch SW. An output of switch SW is connected to capacitance C61, and three stages of serial MOS inverters I1, I2 and I3 are connected to an output of capacitance C61. An output Vo6 of the MOS inverter I3 of the last stage is connected to an input of I1 through feedback capacitance C62. Consequently, an inversion of Vin3 is generated at the output of I3 with a good linearity. When SW is closed, C61 is charged by an electric charge corresponding to Vin6, and the linearity of an output is guaranteed by a feed-back function of I1 to I3. When a switch SW is open after it, sampling and holding circuit SH31 holds Vin6. An output of the last stage I3 is connected to the ground through a grounded capacitance C63, and an output of the second stage is connected to the supply voltage Vdd and the ground through a pair of balancing resistances R61 and R62. Unstable oscillations of an inverted amplifying circuit including feedback circuit is prevented by such a structure. As sampling and holding circuits SH32 to SH3n are structured similar to SH31, the description is omitted.

Figure 7:
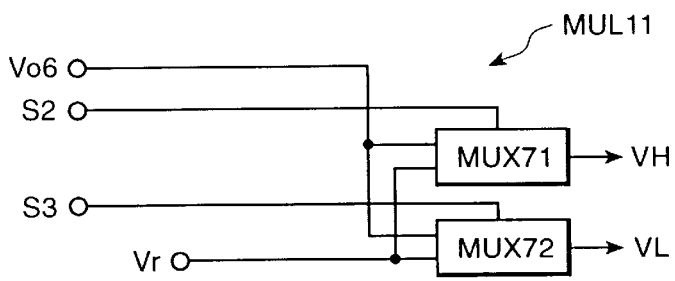
FIG. 7 shows the multiplying circuit in FIG. 2.

As shown in FIG. 7, the multiplication circuit MUL11 consists of two multiplexers MUX71 and MUX72, to which the Vo6 and the common reference voltage Vr are connected.

Switch SW, multiplexers MUX71 and MUX72 are controlled by control signals S1, S2 and S3. After S1 is once closed, SW is opened at the timing of sampling of the input voltage. S2 and S3 are inverted signals. When one of the multiplexers outputs Vin3, the other outputs Vr. MUX71 and MUX72 correspond to the spreading codes "1" (high level) and "−1" (low level). When the code "1" is to be multiplied to an input voltage, Vo6 is output from MUX71, and when the code "−1" is to be multiplied, Vo6 is output from MUX72. In order to represent the levels of high and low, an output of MUX71 is indicated by VH and that of MUX72 is indicated by VL in FIG. 7.

Figure 8:
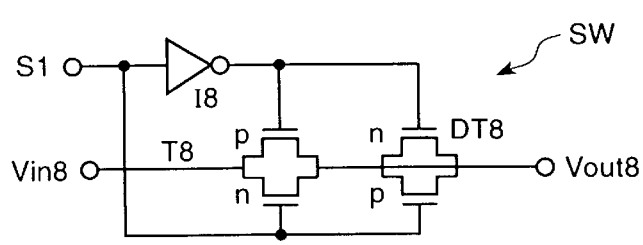
FIG. 8 shows a circuit of the switch in FIG. 6.

As shown in FIG. 8, the switch SW includes a transistor circuit T8 in which a source and a drain of a n-type MOS transistor are connected to a drain and a source of a p-type MOS transistor, respectively. Vin8 is connected to a terminal of a drain of the nMOS of the transistor circuit and a terminal of a source of nMOS is connected to an output terminal Vout8 through a dummy transistor DT8 similar to the nMOS. S1 is input to the gate of the nMOS transistor of the transistor circuit T8, and an inverted signal of S1 by an inverter I8 is input to the gate of pMOS transistor. When S1 is high level, T8 is conductive and when it is low level, T8 is cut off.

Figure 9:
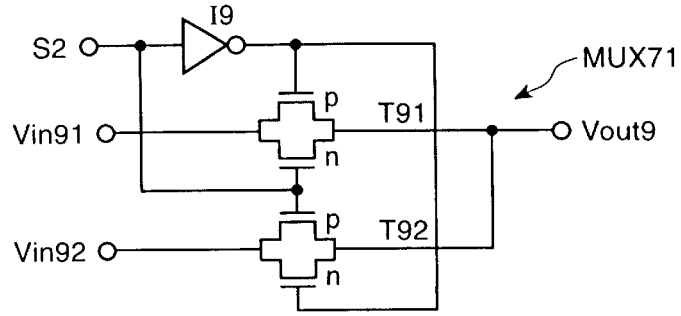
FIG. 9 shows a circuit of the multiplexer in FIG. 7.

As shown in FIG. 9, in multiplexer MUX71, the terminal of the source of nMOS of transistor circuits T91 and T92 is connected to the common output terminal Vout9. An output Vo6 ("Vin91" in FIG. 9) of the MOS inverter I3 is connected to a terminal of a drain of the nMOS of T91, and the reference voltage Vr is connected to a drain of T92 ("Vin92" in FIG. 9). The signal S2 is input to a gate of the nMOS transistor of transistor circuit T91 and gate of the pMOS transistor of transistor circuit T92. The signal S2 inverted by inverter I9 is input to gates of the pMOS of T91 and nMOS of T92. When S2 is high level, T91 is conductive and T92 is cut off, and when low level, T92 is conductive and T91 is cut off. That is, MUX71 can alternatively output Vo6 or Vr in response to the control signal S2. Though it is not shown in the figure, multiplexer MUX72 is structured similar to MUX71 and Vo6 and Vr are connected inversely. Vr and Vo6 of FIG. 9 are connected to T91 and T92, respectively, contrary to the construction of FIG. 7. Consequently, the output of MUX72 is inverse to the output of MUX71; that is, when MUX71 outputs Vo6, MUX72 outputs Vr and when MUX71 output Vr, MUX72 outputs Vo6.

Signal S2 corresponds to spreading codes. When S2 is 1, in a multiplication circuit MUL11, Vo6 and Vr are output from MUX71 and MUX72, respectively, and when S2 is O, Vr and Vo6 are output from MUX71 and MUX72, respectively. These outputs are introduced to the addition circuit ADD31. Though, in FIG. 2, there is shown one signal from MUL11 to ADD31, the signal represents the signals of two lines of high level and low level.

Figure 10:
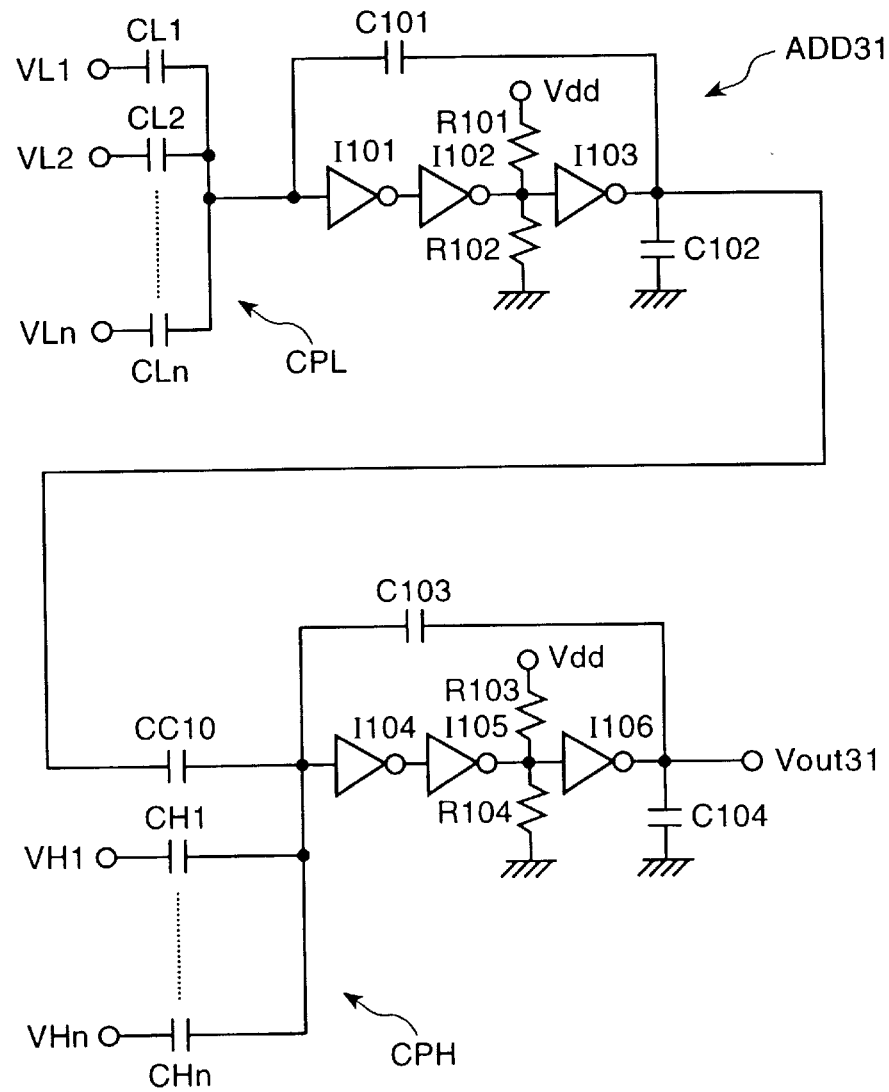
FIG. 10 shows the addition circuit in FIG. 2.

As shown in FIG. 10, the addition circuit ADD31 consists of a capacitive coupling CPH to which high-level signals VH1 to VHn from MUL11, MUL21, . . . , MULn1 are input, and a capacitive coupling CPL to which low-level signals VL1 to VLn from MULn1. The CPL includes capacitances CL1 to Cln parallelly connected, and the CPH includes capacitances CH1 to CHn parallelly connected. An output of CPL is connected to the first input of three steps of MOS inverters I101, I012 and I103, and an output of I103 is fed back to the input of the first stage through a feedback capacitance C101. These three stages of inverters guarantee the linearity of the relationship between an input and an output by high open loop gain.

An output of CPH is connected to the input of the first stage of three stages of serial MOS inverters I104, I105 and I106. An output of I106 is fed back to the input of the first stage through a feedback capacitance C103. These three stages of inverters guarantee the linearity of the relationship between an input and an output by high open loop gain. An output of I103 is connected to an input of I104 through a coupling capacitance CC10 parallel to the capacitive coupling CPH. The summation of an inverted output of the CPL and an output of CPH is input to the three stages of inverters I104 to I106.

Outputs of the last stage of the MOS inverters I3, I103 and I106 in the three stages of inverters are connected to the ground through grounded capacitances C63, C102 and C104, through grounded capacitances C63, C012 and C104, respectively, and outputs of the second stage of the MOS inverters I2, I102 and I105 are connected to the supply voltage Vdd and the ground through pairs of balancing resistances R61 and R62, R101 and R102, and R103 and R104, respectively. An unstable oscillation is prevented of an inverted amplifying circuit including a feedback circuit by such a structure.

The addition circuit ADD31 performs the calculation of formula (7). As the relationships amount capacitances are defined as in formulas (8) to (10), the result of the calculation in formula (11) can be obtained.

$$V_{out31} = V_{dd} - \frac{\left(V_{dd} - \frac{\sum_{i=1}^{n} VL_i \cdot CL_i}{C101}\right) \cdot CC10 + \sum_{i=1}^{n} VH_i \cdot CH_i}{C103} \quad (7)$$

$$CL1 = CL2 = \ldots CLn \quad (8)$$

$$CH1 = CH2 = \ldots = CHn \quad (9)$$

$$C101 = C103 = CC10 = n \cdot CL_i = nCH_i \quad (10)$$

$$V_{out31} = \frac{\sum_{i=1}^{n} (VL_i - VH_i)}{n} \quad (11)$$

The VLi and VHi are rewritten as in formulas (12) and (13) using the reference voltage Vr.

$$VH_i = V_r + vh_i \quad (12)$$

$$VL_i = V_r + vl_i \quad (13)$$

Substituting the formulas (12) and (13) in the formula (11), formula (14) is obtained.

$$V_{out31} = \frac{\sum_{i=1}^{n} (vl_i - vh_i)}{n} \quad (14)$$

Data is inverted by three stages of inverters also in the sampling and holding circuits. Therefore, formula (14) can be rewritten into formula (15) using $S(t-1^*Tc)$ which is a signal that an input signal Vin1 is held in time series by sampling and holding circuits SH31 to SH3n, assuming that a time is t, a chip time is Tc and a natural number is i.

$$V_{out31} = \frac{\sum_{i=1}^{n} PN_i \cdot S(t - i \cdot Tc)}{n} \quad (15)$$

This is a calculation of a general matched filter.

As an output is normalized by the number of inputs n, the maximum output voltage is limited under the supply voltage and the stability of the performance is guaranteed.

Figure 11:
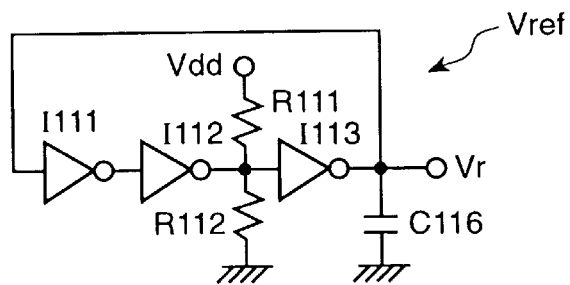
FIG. 11 shows the reference voltage generating circuit.

The reference voltage Vr is generated by a reference voltage generating circuit Vref in FIG. 11. The reference voltage generating circuit is the circuit in which outputs of the last stages of inverters I111, I112 and I113 which are three stages of serial inverters are fed back to an input of the first stage. Similar to the addition circuit above, unstable oscillation is prevented by a grounded capacitance C116, balancing resistances R111 and R112. Output of the reference voltage generating circuit Vref converge on the stable point on which the voltage of inputs equals that of outputs, and the Vref can generate the necessary reference voltage by settling a threshold of each MOS inverter. Generally, there are many cases settled that Vr=Vdd/2 in order to obtain a dynamic range large enough in both directions of plus and minus. Vdd is a supply voltage of a MOS inverter.

A system according to the present invention substantially realizes a multiplication by a circuit for classifying received signals once held in an analog sampling and holding circuit into two groups multiplication and accumulation by a small circuit of low electric power consumption. Therefore, it is possible to judge the soft handoff in high speed.

What is claimed is:

1. A soft handoff system for changing one or more cell-site stations connected to a mobile system among a plurality of cell-site stations around said mobile system by measuring signal strengths from said cell-site stations around said mobile system so that said cell-site stations currently connected are not disconnected until said new cell-site stations are connected, comprising:

(A) a plurality of matched filters corresponding to said cell-site stations around said mobile system, comprising:
   a) a plurality of sampling and holding circuits having,
      i) a switch connected to an input voltage representing the signals received by its respective cell site station,
      ii) a first capacitance connected to an output of said switch,
      iii) a first inverted amplifying portion with odd number of stages of MOS inverters connected to an output of said first capacitance,
      iv) a first feedback capacitance for connecting an output of said first inverted amplifying portion to its input,
      v) a first multiplexer for alternatively outputting an output of said first inverted amplifying portion or a reference voltage, and
      vi) a second multiplexer for alternatively outputting said output of said first inverted amplifying portion or said reference voltage by an inverse alternation of said first multiplexer,
   b) a first addition circuit having,
      i) a plurality of second capacitances each connected with one of outputs of said first multiplexer of each said sampling and holding circuit,
      ii) a second inverted amplifying portion with odd number of stages of MOS inverters to which outputs of said second capacitances are commonly connected, and
      iii) a second feedback capacitance for connecting an output of said second inverted amplifying portion to its input;
   c) a second addition portion having,
      i) a plurality of third capacitances each connected with one of outputs of said second multiplexer and first addition portion of each sampling and holding circuit,
      ii) a third inverted amplifying portion with odd number of stages of MOS inverters to which outputs of said third capacitances are commonly connected, and
      iii) a third feedback capacitance for connecting an output of said third inverted amplifying portion to its input;
   d) a subtracting portion for subtracting an output of said second addition portion from said first addition portion,
   e) a controlling circuit for closing said switch of one of said sampling and holding circuits, simultaneously opening other switches and for switching said first and second multiplexers of each said sampling and holding circuit by a predetermined combination, and (B) a comparison circuit for comparing the signal strength of outputs of each said matched filter circuit.

2. A system as claimed in claim 1, wherein a number of said cell-site stations to be connected with said mobile system is decided by said comparison circuit according to a distribution of peak value of outputs of said matched filter.

3. A system as claimed in claim 2, wherein
   I) said number of said cell-site stations is one when said peak of one matched filter is sufficiently higher than said peaks of other matched filters,
   II) said number corresponds to a plurality of cell-site stations with peaks higher than a predetermined level when said peaks are stepwise from the minimum to the maximum, and
   III) said number is a predetermined number when peaks of outputs of a plurality of matched filters are approximately the same.

4. A system as claimed in claim 1, wherein said sampling and holding circuits comprises one set of said switch, said first capacitance, said first inverted amplifying portion and said first feedback capacitance commonly corresponding to all of matched filter circuits, each matched filter comprises said first and second multiplexers each matched filter which are parallelly connected to said first inverted amplifying portion corresponding to said matched filter.

5. A system as claimed in claim 1, wherein said sampling and holding circuits are classified into a plurality of groups, each said group comprising:
   a) a fourth addition portion connected to an output of a multiplexer in each group, said fourth addition portion comprising;
      i) a plurality of fourth capacitances connected to an output of said first multiplexer of each sampling and holding circuit,
      ii) a fourth amplifying portion with odd number of stage of MOS inverters to which outputs of said fourth capacitances are commonly connected,
      iii) a fourth feedback capacitance for connecting outputs of said fourth inverted amplifying portion to its input,
   an output of said fourth addition portion being input to said second addition portion of all groups;
   b) a fifth addition portion connected to said second multiplexer comprising:
      i) a plurality of fifth capacitances connected to outputs of said second multiplexer and the first addition portion of each sampling and holding circuit,
      ii) a fifth amplifying portion with odd number of stages of MOS inverters to which outputs of said fifth capacitances are commonly connected, and
      iii) a fifth feedback capacitance for connecting outputs of said fifth inverted amplifying portion to its input,
   an output of said fifth addition portion of all group being input to said first addition portion.

6. A system as claimed in claim 1, wherein a grounded capacitance is connected between an output and the ground, and an output of said MOS inverter is connected to a supply voltage and the ground by a pair of balancing resistances connected to said MOS inverter before the last step in said inverted amplifying portion.

7. A system as claimed in claim 1, wherein said controlling circuit controls said sampling and holding circuits so that status of said sampling and holding circuits are circularly changed.

8. A system as claimed in claim 1, wherein a plurality of matched filters are settled so as to perform over-sampling.

* * * * *